United States Patent
Strebe

(10) Patent No.: US 7,200,521 B2
(45) Date of Patent: Apr. 3, 2007

(54) METHOD AND DEVICE FOR DETECTING A FIBER LAP AS WELL AS A FIBER CUTTING MACHINE

(75) Inventor: Matthias Strebe, Neumünster (DE)

(73) Assignee: Saurer GmbH & Co. KG, Monchengladbach (DE)

( * ) Notice: Subject to any disclaimer, the term of this patent is extended or adjusted under 35 U.S.C. 154(b) by 79 days.

(21) Appl. No.: 11/028,762

(22) Filed: Jan. 4, 2005

(65) Prior Publication Data

US 2005/0154541 A1 Jul. 14, 2005

(30) Foreign Application Priority Data

Jan. 10, 2004 (DE) .................. 10 2004 001539

(51) Int. Cl.
*G01S 7/539* (2006.01)
(52) U.S. Cl. ............................................... 702/182
(58) Field of Classification Search ............... 702/182, 702/81; 700/174
See application file for complete search history.

(56) References Cited

U.S. PATENT DOCUMENTS 5,501,104 A * 3/1996 Ikeda et al. ................... 73/629
5,767,963 A 6/1998 Berger
6,098,684 A * 8/2000 Terawaki ..................... 156/353

FOREIGN PATENT DOCUMENTS

| DE | 101 12 679 | 10/2001 |
|---|---|---|
| JP | 7133061 | 5/1995 |

OTHER PUBLICATIONS

Merriam-Webster's dictionary Tenth edition, 1993, p. 431, 1224.*

* cited by examiner

Primary Examiner—John Barlow
Assistant Examiner—Tung S. Lau
(74) Attorney, Agent, or Firm—Alston & Bird LLP

(57) ABSTRACT

A method and a device for detecting a fiber lap on a rotating machine component, wherein a sensor signal is used to detect the fiber lap that has formed on the circumference of the component. To enable a noncontacting monitoring despite unfavorable environmental conditions, the sensor signal includes ultrasound, and an echo sound signal is evaluated to detect the presence of a fiber lap. In one disclosed embodiment, the detecting device is used in association with a fiber cutting machine for cutting tow, and which includes a rotating cutting blade holder and a rotatable pressure ring, which cooperate for cutting the tow. To achieve a shutdown of the machine as quickly as possible upon formation of a fiber lap, the fiber lap is directly monitored on the circumference of the pressure ring by means of a sensor unit which has an ultrasonic transmitter and a sound receiver.

15 Claims, 2 Drawing Sheets

METHOD AND DEVICE FOR DETECTING A FIBER LAP AS WELL AS A FIBER CUTTING MACHINE

BACKGROUND OF THE INVENTION

The present invention relates to a method and device for detecting a fiber lap on a rotating machine component, as well as a fiber cutting machine which includes the device.

When treating and processing strandlike fibers, the latter advance over or through rotationally symmetric components, which may be used, for example, as rolls for drawing, as feed systems for advancing, as pressure rolls, drive rolls, or pressure rings in fiber cutting machines. As soon as fiber strands advance in contact with or in the vicinity of such rotating components, there basically arises the problem that so-called laps may develop. In such cases, adhesive forces entrain the fiber strands on the circumference of the rotating component and wrap it around the component. Formations of such fiber laps must be rapidly detected to avoid long shutdown times or even destruction of the components.

To this end, methods and devices are known, wherein the circumferential surface of a rotating machine component is detected. In this case, one may basically differentiate between two variants. In a first variant, as is disclosed, for example, in EP 0 740 639 B1, the fiber lap is detected without being contacted. Specifically, the circumferential surface of the rotating component is sensed by means of a light source and an optical system. The light reflected from the fiber lap is used for identifying a fiber lap that has formed on the circumference of the component. However, optical methods and devices of this type are very susceptible to malfunction, since soiling of transmitters and receivers, as well as flying lint lead to frequent error detections.

In a second variant of the known methods and devices for detecting a fiber lap, a direct contact is produced between the fiber lap and a sensing element by mechanical scanning, as is disclosed, for example, in DE 101 12 679 A1 or JP 7133061. In both cases, a sensing element is positioned at a short distance from the surface of the rotating component. As soon as a fiber lap has formed on the circumference of the component, a direct contact of the fiber lap with the sensing element will release a measuring signal for detecting the fiber lap. Devices of this type, however, have the problem that the sensing element can get caught in the loops and irregularities of the fiber strands and that it can be entrained or be destroyed. In addition, joints, springs, and microswitches make the mechanical setup cost intensive as well as susceptible to wear.

It is therefore an object of the invention to provide a method and a device of the initially described type for detecting a fiber lap on a rotating machine component, which permits identifying fiber laps in a reliable and reproducible manner.

It is another object of the invention to provide a fiber cutting machine for a tow with a fiber lap detection device, which permits a rapid and reliable process intervention after detecting a fiber lap.

Another object of the invention is seen in providing a method and a device for detecting a fiber lap, as well as a fiber cutting machine with such a device for detecting a fiber lap, which permits detecting in a noncontacting manner laps that are produced by tows on rotating components.

SUMMARY OF THE INVENTION

The above and other objects and advantages of the invention are achieved by the provision of a method and device of the described type and wherein a sensor unit is provided for generating a sensor signal which strikes the circumference of the rotating component and generates an echo signal which is sensed by a receiver. Significantly, the sensor signal is a sound signal in the ultrasound frequency range.

The invention has the special advantage that it uses an acoustic signal for sensing the fiber lap without contacting it. This signal is largely independent of soiling and flying lint. The sensor signal which is generated as an ultrasound leads on the circumferential surface or on the surface of the fiber lap to an echo sound signal, which is evaluated for determining the fiber lap. The distance between the circumferential surface of the rotating component and the ultrasonic transmitter can be directly adapted to the circumstances, so that fiber strands in the form of yarns are detectable at a corresponding short distance, or fiber strands in the form of tows at correspondingly greater distances. In this process, volatile parts that separate from the fiber strand, such as, for example, lint or fiber lubricant residues, remain without influence on the quality of the monitoring. Thus, the invention is especially suited for performing a monitoring of laps directly in the vicinity of fiber strands that are to be produced, without requiring the presence of an operator.

To obtain a high monitoring sensitivity, an advantageous further development of the invention provides for directing the sensor signal substantially perpendicularly to the circumferential surface of the rotating component. With that, it is possible to form a focused monitoring range on the circumference of the rotating component. Additionally, by combining the ultrasonic transmitter and the sound receiver to a structural unit, a very compact sensor unit is created, which can be excellently shielded against external influences.

In the case of a constantly predetermined spacing between the sensor unit and the rotating component, it is possible to generate a difference signal directly from the variation between an actual transit time and a predetermined desired transit time of switching signals. To this end, an advantageous further development of the invention provides for measuring the actual transit time from transmitting the sensor signal until receiving the echo sound signal, and for comparing it with the predetermined desired transit time that defines the situation without fiber laps. Thus, the difference signal that is determined from the variation directly contains information about the presence of a fiber lap.

To achieve shutdown times that are as short as possible, or to avoid damage to the component, the difference signal can be used for directly releasing a control command or for generating an alarm signal. To this end, the sensor unit is advantageously coupled via an interface with a process control unit or a machine control unit.

The further development of the invention, wherein the sensor signal is generated by successive sound pulses with a desired transit time being associated to each sound pulse, is especially suited for obtaining a continuous monitoring. To this end, the ultrasonic transmitter includes a pulsing device for generating sound pulses. However, it is also possible to link the generation of the sound pulses to a movement of the sensor unit, so that a plurality of ranges are successively detectable on the circumference of the rotating component.

Because of the flexible arrangement of the sensor units as well as the insensitivity of the sensor signals, the invention is especially suited for detecting tows. In particular in so-called fiber cutting machines, breakdowns may occur during the cutting process in such a manner that the continuous tow enters the cutting space of the machine in an unclean manner. This may cause laps to form on the rotating components of the machine, which require a direct intervention into the cutting process. In the case of a fiber cutting machine of the invention, it is thus possible to monitor laps directly on the circumference of a pressure ring, which supports the tow as it enters the cutting space.

In this connection, it is advantageous to couple the sensor unit directly with the machine control unit, so that same causes the fiber cutting machine to shut down upon detection of a lap.

BRIEF DESCRIPTION OF THE DRAWINGS

In the following, the method and the device of the invention for carrying out the method, as well as a fiber cutting machine of the invention are described in greater detail with reference to the attached Figures, of which.

DETAILED DESCRIPTION OF THE PREFERRED EMBODIMENTS

Figure 1:
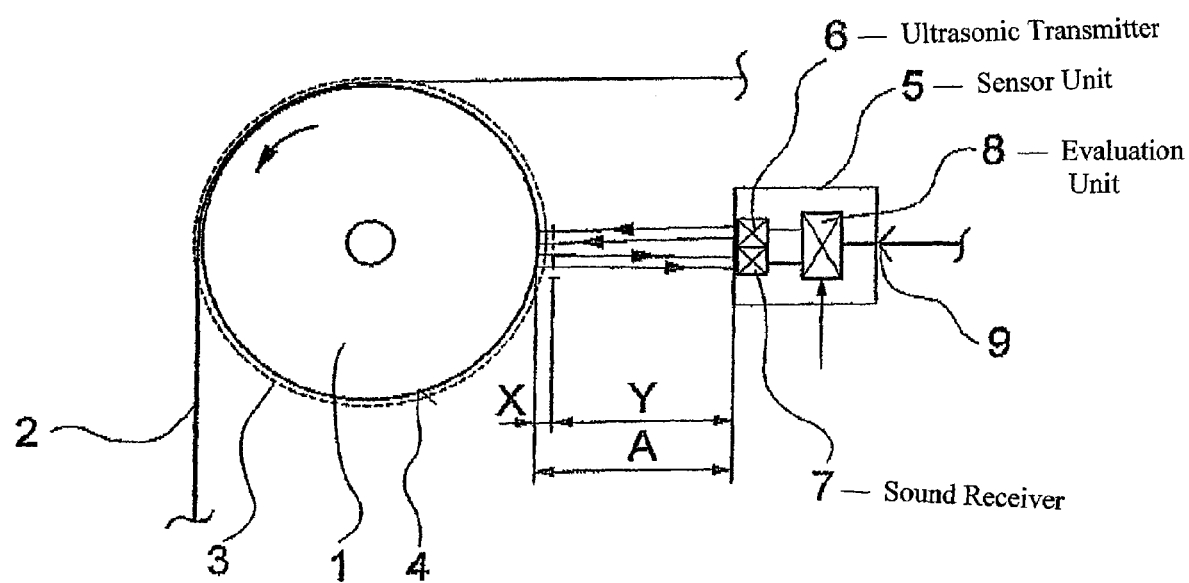
FIG. 1 is a schematic view of an embodiment of the device according to the invention for carrying out the method of the invention for detecting a fiber lap.

FIG. 1 schematically illustrates a first embodiment of a device according to the invention for carrying out the method of the invention for detecting a fiber lap.

The device comprises a sensor unit 5, which is arranged at a distance A from a rotating component. The rotating component is shown as a roll 1, which is supported for rotation. On a circumferential surface 4 of the roll 1 a fiber strand 2 advances while partially looping the roll. The sensor unit 5 is arranged substantially in spaced relationship with the looping range of the fiber strand 2 on the roll 1.

The sensor unit 5 comprises an ultrasonic transmitter 6 and a sound receiver 7, which are combined to a structural unit. The ultrasonic transmitter 6 and the sound receiver 7 connect to an electronic evaluation unit 8. Via an interface 9, the sensor unit 5 connects to a process control unit not shown.

In the embodiment shown in FIG. 1, the fiber strand 2 could be formed, for example, by a yarn, a tape, or a tow. The roll 1 could be associated to a feed system or a draw unit. In operation, conditions may arise, which cause, for example, the fiber strand 2 to break or sag. Such malfunctions result in that the fiber strand wraps as a fiber lap 3 around the circumferential surface of the roll 1. To this end, FIG. 1 shows the fiber lap 3 in phantom lines.

During the operation, the sensor unit 5 continuously monitors a certain range of the circumferential surface 4 of the roll 1. In so doing, the ultrasonic transmitter 6 generates a sensor signal in the form of sound in the ultrasound frequency range. To this end, the ultrasonic transmitter 6 is oriented substantially perpendicularly to the circumferential surface 4 of the roll 1, so that the sensor signal strikes the circumferential surface 4 of the roll 1 substantially perpendicularly. On the circumferential surface 4 of the roll 1, the sensor signal generates an echo sound signal which is received by the sound receiver 7.

In the electronic evaluation unit 8 that is coupled with the ultrasonic transmitter 6 and the sound receiver 7, an actual transit time is measured from transmitting the sensor signal until receiving the echo sound signal. The actual transit time is compared with a predetermined desired transit time. The desired transit time which is essentially defined by the distance A, indicates the condition of the circumferential surface 4 of the roll 1 without a fiber lap. With that, it is possible to determine directly from the variation between the effectively measured actual transit time and the predetermined desired transit time, whether or not a fiber lap has formed. The variation between the actual transit time and the desired transit time leads to a difference signal that is supplied via the interface 9 to a subsequent process control unit. Within the process control unit, the difference signal may be used for releasing a control command or for generating an alarm signal. It is thus possible to use the control command for initiating a direct change in the process or a discontinuation thereof. The generation of an alarm signal can be used for alerting, for example, an operator to remove the fiber lap.

By predetermining different sound transit times, the method of the invention permits defining an intended detection range directly in the vicinity of the surface being monitored. In the embodiment of FIG. 1, the distance A between the circumferential surface 4 of the roll 1 and the sensor unit 5 is divided to this end into a detection range X and an adjacent range Y. By a corresponding selection of the sound transit times, it is possible to keep the detection range X very small, so that, for example, the surface of the roll 1 is detectable up to a distance of 1 millimeter. Thus, the detection range would be 1 millimeter. This kind of adjustment has the special advantage that external influences in the adjacent range, for example by lint, can be ignored, and thus have no influence on the surface detection.

However, in the case that an obstacle which cannot be irradiated with ultrasonic waves is placed in the adjacent range Y, it is possible to identify same and to release an error signal. With that, it is possible to monitor, for example, malfunctions of a safety device or to avoid undue interventions of the operator.

Figure 2:
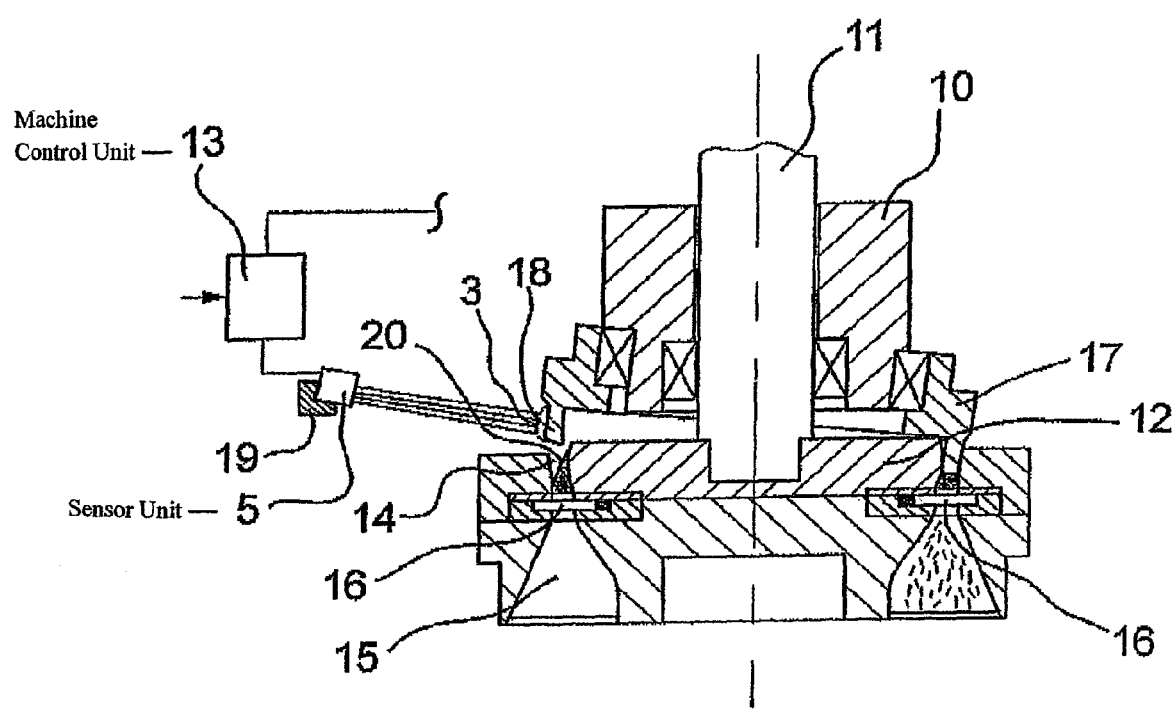
FIG. 2 is a schematic view of an embodiment of the fiber cutting machine with a sensor unit for monitoring laps.

FIG. 2 schematically illustrates a longitudinal view of an embodiment of a fiber cutting machine according to the invention. The fiber cutting machine comprises a bearing housing 10 with a drive shaft 11 extending therethrough. The drive shaft 11 is supported for rotation within the bearing housing 10. The free ends of the drive shaft 11, which project from the bearing housing 10 mount a cutting blade holder 12. The opposite end of the drive shaft 11 connects to a drive not shown, which can be activated via a machine control unit.

The cutting blade holder 12 consists of a plurality of parts, which form a peripheral annular channel 14. On an outlet side, the annular channel 14 opens to an outlet channel 15. Between the annular channel 14 and the outlet channel 15, the holder 12 mounts a plurality of cutting blades 16. The cutting blades 16 which are radially oriented relative to their holder 12 extend through the connection between the annular channel 14 and the outlet channel 15, with the edges of the cutting blades 16 pointing in the direction of the annular channel 14.

Above the cutting blade holder 12, an inclined pressure ring 17 is supported for rotation on the circumference of the bearing housing 10. The pressure ring 17 possesses an annular projection 18 that extends into the annular channel 14 over only a part of the circumference of the annular channel 14. The pressure ring 17 is mounted for free rotation about the bearing housing 10.

On the side, on which the pressure ring 17 extends above the cutting blade holder 12, a sensor unit 5 is arranged in spaced relationship with the pressure ring 17. A holder 19 of the machine frame of the fiber cutting machine mounts the sensor unit 5. The sensor unit 5 connects to a machine control unit 13.

The construction and function of the sensor unit 5 is identical with that of the foregoing embodiment of FIG. 1, so that at this point the foregoing description is herewith incorporated by reference.

For cutting a tow, the cutting blade holder 12 is driven for rotation by the drive shaft 11. In this process, a tow 20 is pulled into the annular channel 14 between the rotating cutting blade holder and the inclined pressure ring 17. The friction with the tow 20 causes the pressure ring 17 to also rotate. After a rotation of about 180°, the projection 18 of the pressure ring 17 presses the tow inside the annular channel 14 against the radially extending cutting blades 16, so that the tow is cut to defined lengths by the spaced cutting blades 16.

In the cases in which a breakdown occurs as the tow 20 enters the annular channel 14, a fiber lap 3 may form on the circumference of the pressure ring 17. The fiber lap 3 is shown in phantom lines in FIG. 2. To cause the machine to shut down, as much as possible directly after the tow 20 advances onto the pressure ring 17, the sensor unit 5 monitors a range of the circumferential surface of projection 18. The monitoring and detecting occur in the same way as has previously been described with reference to the embodiment of FIG. 1. Upon detection of a fiber lap, the difference signal that the sensor unit 5 supplies to the machine control unit 13 is directly converted into a control command for shutting down the machine. With that, it becomes possible to prevent very early a progressive formation of laps on the rotating components of the machine.

The method and the device of the invention are suited for detecting fiber laps regardless of the type of fiber strand. By varying the distance, which may range from few millimeters to a few centimeters, it is possible to adjust the monitoring sensitivity and the range being monitored to any desired extent. Thus, it is possible to reliably identify a fiber lap with a diameter of 1 mm, for example, at a distance of 1,000 mm.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of detecting a fiber lap on a rotating machine component, comprising the steps of
   advancing a fiber strand in contact with or in the vicinity of a rotating machine component,
   generating an ultrasound sensor signal at a location spaced from the rotating component so as to define an open space between the rotating component or the fiber strand and said location, and directing the signal toward the rotating component,
   sensing an echo sound signal which results from the sensor signal being reflected from the rotating component,
   evaluating the sensed echo sound signal so as to detect the presence of a fiber lap on the rotating component, and
   upon detecting the presence of a fiber lap, releasing a control command for a process change and/or to generate an alarm signal.

2. The method of claim 1, wherein the sensor signal is directed substantially perpendicularly toward the circumference of the rotating component.

3. The method of claim 1, wherein the evaluating step includes measuring an actual transit time between the transmission of the sensor signal toward the rotating component and receiving the echo sound signal, comparing the actual transit time with a predetermined desired transit time, and generating a difference signal upon a deviation of the actual transit time from the desired transit.

4. The method of claim 3, wherein the sensor signal comprises successive sound pulses, with the desired transit time being associated with each sound pulse.

5. A device for detecting a fiber lap on a rotating machine component, comprising
   a sensor unit for generating a sensor signal and positioned in spaced relationship to the rotating component so as to define an open space between the rotating component and the sensor unit, such that the sensor signal strikes the circumference of the rotating component, and
   wherein the sensor unit comprises an ultrasonic transmitter for generating the sensor signal as a sound signal in the ultrasound frequency range, and a sound receiver for receiving an echo signal which is reflected from the rotating component.

6. The device of claim 5, wherein the ultrasonic transmitter and the sound receiver are combined to form a structural unit, and that the structural unit is arranged in predetermined spaced relationship with the circumferential surface of the rotating component in such a manner that the sensor signal strikes the circumferential surface of the component perpendicularly.

7. The device of claim 5, wherein the sensor unit further comprises an electronic evaluation unit, which permits measuring an actual transit time between transmitting the sensor signal and receiving the echo sound signal, comparing the actual transit time with a predetermined desired transit time, and generating a difference signal upon a deviation of the actual transit time from the desired transit time.

8. The device of claim 7, wherein the evaluation unit comprises an interface for linking to a process control unit.

9. The device of claim 5, wherein the ultrasonic transmitter comprises a pulsing device for generating sound pulses.

10. A fiber cutting machine for cutting a tow into defined lengths, comprising
    a rotatable cutting blade holder having an annular channel for receiving an advancing tow during rotation of the holder, and with a plurality of cutting blades spaced about the circumference of the annular channel,
    a rotatable pressure ring which is configured to rotate with the cutting blade holder and feed the advancing tow into the channel so as to be cut by the cutting blades, and
    a device for detecting a fiber lap on the rotatable pressure ring comprising a sensor unit for generating a sensor signal and positioned in spaced relationship to the rotatable pressure ring so as to define an open space between the rotating pressure ring and the sensor unit, such that the sensor signal strikes the circumference of the pressure ring, and wherein the sensor unit comprises an ultrasonic transmitter for generating the sensor signal as a sound signal in the ultrasound frequency range, and a sound receiver for receiving an echo signal which is reflected from the pressure ring.

11. The fiber cutting machine of claim 10, further comprising a machine control unit connected to the sensor unit for controlling the operation of the fiber cutting machine.

12. The fiber cutting machine of claim 10, wherein the sensor unit is mounted in a predetermined spaced relationship to a machine frame in such a manner that the sensor signal strikes the circumference of the pressure ring substantially perpendicularly.

13. The fiber cutting machine of claim 10, further comprising a drive fixed to the cutting blade holder for rotating the cutting blade holder about a central axis.

14. The fiber cutting machine of claim 13, wherein the pressure ring is mounted for free rotation about an axis which is inclined with respect to said central axis and so that the pressure ring extends into the annular channel over only a part of the circumference of the annular channel.

15. The fiber cutting machine of claim 13, wherein the sensor unit is positioned so that the sensor signal strikes that portion of the pressure ring which does not extend into the annular channel.

* * * * *

UNITED STATES PATENT AND TRADEMARK OFFICE
CERTIFICATE OF CORRECTION

| | | |
|---|---|---|
| PATENT NO. | : 7,200,521 B2 | Page 1 of 1 |
| APPLICATION NO. | : 11/028762 | |
| DATED | : April 3, 2007 | |
| INVENTOR(S) | : Strebe | |

It is certified that error appears in the above-identified patent and that said Letters Patent is hereby corrected as shown below:

Column 6,

Line 18, after "transit" insert --time--.

Signed and Sealed this

Third Day of July, 2007

JON W. DUDAS
*Director of the United States Patent and Trademark Office*